June 23, 1959 J. E. DAVIS 2,892,023
COLOR TELEVISION RECEIVER
Filed April 3, 1956
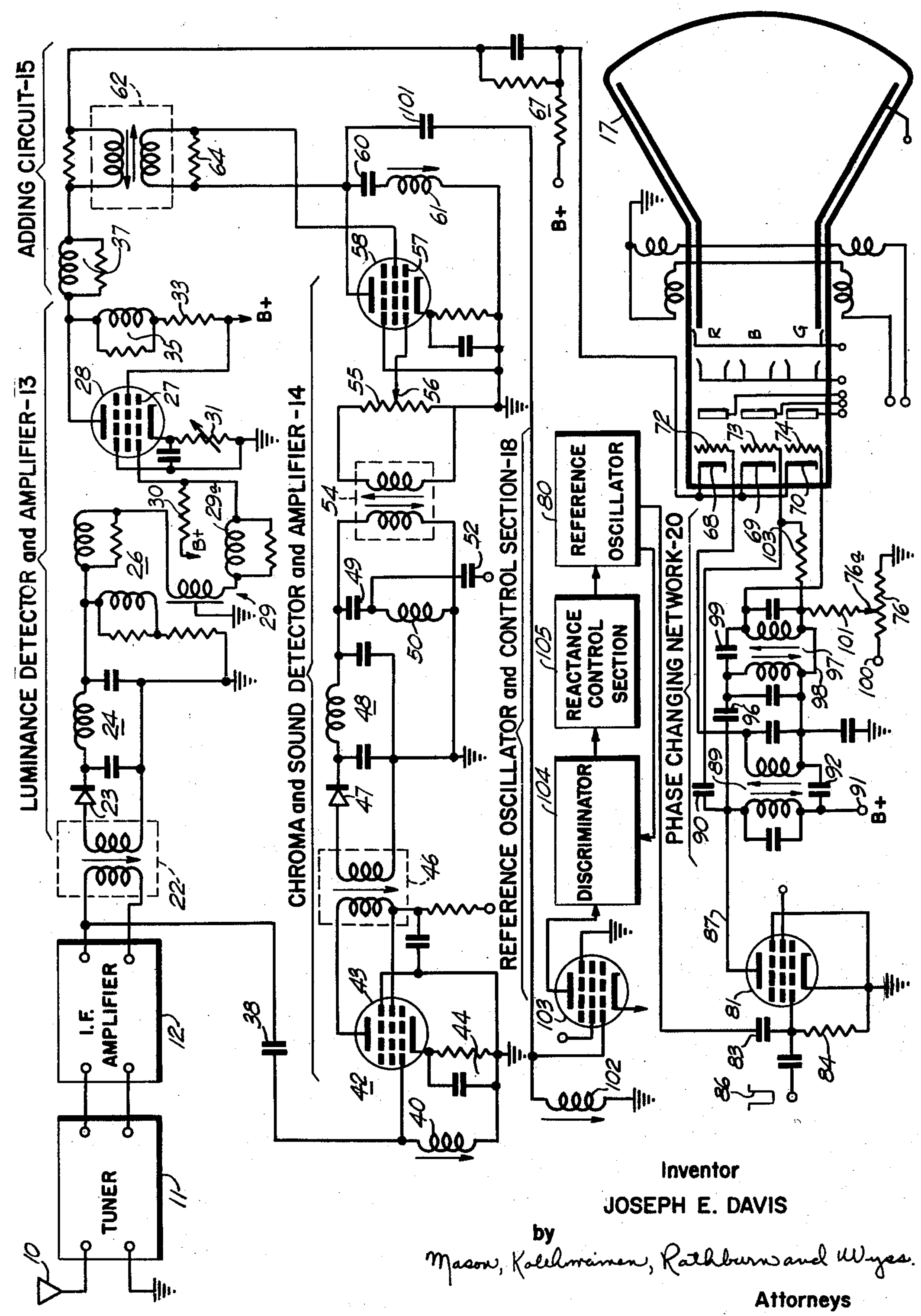
Inventor
JOSEPH E. DAVIS
by
Mason, Kolehmainen, Rathburn and Wyss.
Attorneys United States Patent Office 2,892,023

Patented June 23, 1959

2,892,023

COLOR TELEVISION RECEIVER

Joseph E. Davis, Buffalo, N.Y., assignor, by mesne assignments, to Sylvania Electric Products Inc., Wilmington, Del., a corporation of Delaware Application April 3, 1956, Serial No. 575,844

7 Claims. (Cl. 178—5.4)

The present invention relates to color television receivers, more particularly to the chroma demodulation and matrixing circuits of color television receivers, and the invention has for an object the provision of a simplified matrixing and chroma demodulation circuit which is substantially less expensive to manufacture than those circuits known in the prior art for performing the same functions.

In color television receiver arrangements heretofore proposed, the picture carrier which is modulated by the brightness or luminance signal components, sometimes called the $E_Y$ signal, and by a color subcarrier which itself is modulated by the chrominance or color information signal components, and a sound carrier which is modulated by the sound signal accompanying the color picture signal, are simultaneously amplified in an intermediate frequency amplifier channel consisting of a plurality of cascade connected stages. The various modulation components are thereafter separately derived from the output of this common intermediate frequency channel. In such prior art color television receiver arrangements the modulated picture carrier wave, which contains the luminance signal components as well as the chroma modulated subcarrier wave components, is demodulated in a video detector to remove the carrier wave components therefrom and is then separated into a chroma modulated subcarrier wave signal and a luminance signal. The chroma modulated subcarrier wave is applied to an amplifier and the chroma signals are derived from the modulated subcarrier wave in a chroma demodulation section. The chroma signals, usually two in number, which are derived from the demodulator section are then recombined with the luminance signal in a matrixing section to provide the three color output signals which are supplied to and control the intensity of the electron beams from the respective electron guns of a three-gun color television picture tube.

In order to eliminate the separate chroma demodulation sections from a color television receiver utilizing a three-gun type picture tube, it has been disclosed in application Serial No. 475,710, Squires, filed December 16, 1954, which application is assigned to the same assignee as the present invention, to amplify both the luminance signal and the chroma modulated subcarrier wave signal in a common amplifier section and to supply both signals as detected from the modulated picture carrier to the three electron guns in the picture tube and to sample this composite signal by means of three out-of-phase reference waves at the subcarrier frequency which are suitably supplied to the respective control electrodes of the guns. In this manner the subcarrier wave components do not appreciably affect the intensities of the three beams and these intensities thereby vary in accordance with the variations in the intensity of the corresponding colors as the televised image is scanned at the transmitter. Although the receiver disclosed in the above identified application provides a usable picture, because the difference in the frequencies of the luminance signal components and the chroma modulated subcarrier components is appreciable, these signals are attenuated by different amounts as the televised signal passes through the transmission medium, and as a result, the ratio of the chroma-to-luminance signal amplitudes may exceed a predetermined value above which an objectionable interference pattern in the form of a fine grain structure may appear in the reproduced image.

Accordingly, another object of the present invention is to provide a new and improved demodulation and matrixing section for a three-gun type television picture tube receiver in which the above described differences in attenuation of the luminance signal components and the chroma components may be compensated for at the receiver.

A further object of the present invention is to provide a new and improved television receiver in which demodulation of the chroma modulated subcarrier wave is effected in the picture tube while providing adjustment of the chroma-to-luminance signal amplitudes prior to application of these signals to the picture tube.

Briefly, the above and further objects are realized in accordance with one aspect of the present invention by providing a color television receiver in which the luminance signal components and the chroma modulated subcarrier signal components are separately detected from the IF composite signal, are separately amplified by controllable amounts and are then recombined for application to suitable electrodes of a three-gun picture tube. A subcarrier reference wave is developed in the receiver and portions thereof are shifted in phase so as to provide three sampling waves having the frequency of the subcarrier and which have respective phases corresponding to the three color components of the received wave. The three sampling waves are respectively supplied to suitable electrodes of the respective guns and the bias voltages on the guns are selected such that demodulation and matrixing are effected simultaneously directly in the picture tube.

In accordance with another aspect of this invention the recombined chroma modulated subcarrier and luminance signal is supplied through a low impedance coupling circuit to the cathodes of the picture tube and the subcarrier reference waves are supplied to the control grids of the electron guns through high impedance circuits, whereby a minimum of cross-interference between the detected color signals is produced.

Further objects and advantages and a better understanding of the present invention may be had from the following detailed description taken in connection with the accompanying drawing in which the single figure is a schematic electric circuit diagram of a portion of a color television receiver embodying the present invention.

Referring now, more particularly, to the single figure of the drawing, the present invention is therein illustrated in conjunction with a color television receiver which includes an antenna system 10, connected to a tuner unit 11, which is adapted to select signals from any desired color television station and to convert the received color television signal into a suitable intermediate frequency signal which includes a picture carrier modulated by the brightness or luminance signal component and by the chroma modulated subcarrier signal components, and a sound carrier modulated by the sound signal which accompanies the received color picture signal. It will be understood that the received signal also includes signals for synchronizing the scanning circuits of the receiver with the scanning circuits at the transmitter. Since the operation of scanning circuits is well known, and since these circuits do not constitute a part of the present invention, they are not described herein.

The complete color television signal is coupled to and amplified in a wide band video and sound IF amplifier 12 wherein the level of the composite signal wave is raised to a suitable value before distribution to the remaining portions of the receiver. As is described in greater detail hereinafter, a portion of the output signal from the wide band IF amplifier 12 is supplied to a luminance detector and amplifier section or channel 13 and another portion is supplied to a chroma and sound detector and amplifier section or channel 14. The respective signal components are detected in these channels from the modulated picture carrier wave and the relative amplitudes of the luminance signal and the chroma modulated subcarrier signal are adapted to be adjusted by means of separate amplification controls provided in each of the channels 13 and 14. Accordingly, the ratio of the luminance-to-chroma modulated subcarrier signals may be maintained above that value at which the subcarrier wave interference pattern would appear in the picture.

The output signals from the channels 13 and 14 are superimposed in an adding circuit 15 for application to suitable electrodes of a three-gun picture tube 17. The color burst signal which is present in the output signal from the channel 14 is supplied to a reference oscillator and control section 18 for maintaining the frequency of the subcarrier reference wave substantially equal to the frequency of the subcarrier wave on which the chroma signals are modulated. The reference wave is supplied to a high impedance phase changing network 20 which supplies sampling waves at the subcarrier frequency to the respective guns of the picture tube 17. The phase angles of the three sampling waves are respectively equal to the phase angles of the colors in the televised wave corresponding to the three guns in the picture tube 17. Therefore, the composite signal which is supplied to the guns is sampled by the reference waves and the intensity of the respective electron beams thus corresponds to the intensity of the corresponding colors in the segment of the picture which is being televised.

Considering now in more detail those portions of the receiver which embody the features of the present invention, a portion of the composite signal from the IF amplifier 12 is coupled through a wide band tuned IF transformer stage 22 to a unidirectional impedance detector device 23 which is serially connected with the secondary winding of the transformer 22 across the input terminals of a tuned low pass filter section 24. The video or luminance signal which is thus detected from the modulated picture carrier is passed through a conventional compensating network 26 through a delay line 29, a terminating network 29*a* and impressed upon the control grid 27 of a video amplifier 28. A source of B+ potential is connected through a dropping resistor 30 to the control grid 27 and the cathode of the damper 28 is connected to ground through an adjustable cathode resistor 31 whereby the bias voltage which is connected between the control electrode 27 and the cathode is adjustable. It will thus be clear to those skilled in the art that the adjustable cathode resistor 31 provides a gain or contrast control for the luminance channel of the reecver. B+ voltage is supplied to the screen electrode of the device 28 and to the anode thereof through a suitable anode load resistor 33 and a compensating network 35. The amplified luminance signal is supplied from the anode of the device 28 through another conventional compensating circuit 37 for application to the adding circuit 15.

Another portion of the modulated picture carrier wave provided at the output of the IF amplifier 12 is coupled to the chroma and sound detector and amplifier channel 14 by means of a series resonant circuit comprising a capacitor 38 and an adjustable inductance device 40. The luminance signal components which are applied to the channel 14 are minimized by tuning this resonant circuit approximately to the subcarrier frequency, which at the present time is 3.58 megacycles. Inasmuch as the Q of this series circuit is relatively low, the modulated sound carrier as well as the modulated color subcarrier signal components are substantially unattenuated as they are coupled from the IF amplifier 12 to the channel 14. As shown, the first stage of the channel 14 is an IF amplifier 42 consisting of an amplifier tube 43 having a self-biasing network 44 connected between the cathode and ground and includes an IF transformer stage 46 which has a bandpass of approximately two megacycles so as to pass both the chroma modulation signal and the sound signal but to reject the luminance signal components. The amplified chroma and sound signals are coupled by means of the transformer 46 to a unidirectional impedance detector device 47 which is serially connected to the secondary winding of the transformer 46 across the input terminals of a tuned low pass filter network 48. In order to separate the modulated sound carrier wave from the chroma modulated subcarrier, a series resonant circuit including a capacitor 49 and an inductor 50 is tuned to the frequency of the sound carrier, i.e., 4.5 megacycles, and is connected across the output of the filter 48. Consequently, the modulated sound carrier signal is developed across the inductor 50 for conveniently coupling through a blocking condenser 52 to the audio detector and amplifier channel of the receiver (not shown). The chroma modulated subcarrier signal is coupled through a tuned transformer 54 to a potentiometer 55. An adjustable tap 56 on the potentiometer 55 is directly connected to the control grid 57 of a chroma amplifier 58. Because a small amount of the modulated sound carrier is present in the signal coupled to the amplifier 58, an additional 4.5 megacycle trap in the form of a series resonant circuit including a condenser 60 and an adjustable inductor 61 is connected between the anode of the device 58 and ground. As a result, when the sound carrier is not supplied to the guns of the picture tube 17 an objectional 9.20 kilocycle beat pattern does not appear in the picture.

The output from the chroma amplifier 58 is taken between the anode and the screen grid thereof and is impressed across the primary winding of a transformer 62 in the adding circuit 15. For the purpose of flattening out the response curve of the transformer 62 a pair of resistors 64 and 65 are respectively connected across the primary and secondary windings thereof.

In accordance with the present invention, the luminance signal from the amplifier 13 is developed across the resistor 33 and the chroma modulated subcarrier wave is developed across the secondary winding of the transformer 62 and hence across the resistor 65. Consequently, these two signals are added in series for application to all of the cathodes 68, 69, and 70 of the picture tube 17 through the biasing and coupling network 67.

The potentiometer 55 comprises the chroma gain control of the receiver and when used in conjunction with the contrast control rheostat 31 in the luminance channel 13 may be used to adjust the relative amplitudes of the luminance signal and the chroma modulated subcarrier wave so as to minimize, if not altogether eliminate, the subcarrier wave interference pattern in the picture.

As shown, the picture tube 17 is conventional, being provided with three guns which respectively include the cathodes 68, 69 and 70 and control electrodes 72, 73, and 74. Cross-talk between the three guns is prevented even though the cathodes thereof are directly connected together by utilizing a low impedance cathode circuit and high impedance control grid circuits. With this arrangement, the changes in the current in any one cathode due to variations in the grid signal associated therewith has no appreciable effect on the voltage of, and hence, the current in the other cathodes.

For the purpose of providing in the receiver a reference wave at the frequency of the color subcarrier, there is provided a reference oscillator 80 which generates a subcarrier reference wave which is coupled through a gated amplifier tube 81 for application to the phase changing network 20. Considered more specifically, the subcarrier reference wave from the reference oscillator 80 is coupled to the control electrode of the tube 81 through an RC coupling circuit comprising a capacitor 83 and a resistor 84, and the amplified reference wave is taken off at the anode of the tube 81. The tube 81 is gated off during occurrence of the subcarrier burst in the received wave so as to prevent the burst signal from being coupled through the reference oscillator and control section 18 to the control grids of the picture tube 17. If the video signal were relatively weak and the burst signal were to appear in the detector circuits, namely, the grid-to-cathode circuits of the picture tube, the detectors would set up on the burst. The negative going gate pulse 86 may be conveniently derived from the horizontal deflection system in the receiver. Because of the fact that the burst signal occurs during the retrace period, the omission of the subcarrier wave during this period has no effect on the picture.

In accordance with present day NTSC standards, the television signal includes a modulated subcarrier wave containing red, blue and green components. These components are respectively modulated on the subcarrier wave at phase angles of 90 degrees, 0 degree and 236 degrees. Consequently, by supplying the grids 72, 73 and 74 of the picture tube 17 in the subcarrier reference waves at these relative phases, the intensity of the electron beams vary in accordance with the red, blue and green color components of the received signal. This method of demodulating a phase or frequency modulated wave is known as sampling.

As shown, the reference wave is supplied from the anode of the gating tube 81 through a conductor 87 and a coupling capacitor 90 of relatively large value to the grid 73 of the blue gun. The primary winding of a critically coupled transformer 89 is interconnected between a B+ terminal 91 and the conductor 87 and both the primary and secondary windings thereof are tuned to the subcarrier frequency. Since the lower ends of both windings are connected together for alternating current by a large coupling capacitor 92, the signal at the upper end of the secondary winding is shifted plus 90 degrees with respect to the driving signal. Accordingly, the upper end of the secondary winding of the transformer 89 may be directly connected to the grid 72 of the red gun.

In order to provide a reference wave having a phase angle of 236 degrees with respect to the subcarrier, there is provided a second phase shift transformer 97 which is employed to produce a phase shift in the applied wave of minus 124 degrees. Therefore, the signal from the anode of the tube 81 is coupled through a coupling capacitor 96 to the primary winding of the transformer 97 and the primary winding of the transformer 97 is coupled to the secondary thereof through the capacitor 99, the upper end of the secondary winding of the transformer 97 being directly connected to the grid 74 of the green gun. The lower ends of the primary and secondary windings of the transformer 97 are connected together by a conductor 98, the primary and secondary windings are respectively tuned above and below resonance and the capacitors 96 and 99 are so chosen that the above described phase shift of minus 124 degrees is obtained.

In accordance with another aspect of the present invention, a single potentiometer 76 controls the bias potential on the three grids 72, 73 and 74 and thus provides a unitary control for setting up the background level. As shown, the potentiometer 76 is connected between a B+ terminal 100 and ground and the selected D.C. voltage is coupled through a resistor 101 from the adjustable tap 76*a* of the potentiometer 76 to the secondary winding of the transformer 89 and both windings of the transformer 97. This selected D.C. level is also coupled through a resistor 103 to the grid 73 of the blue gun. As thus described, the potential of each of the control grids 72, 73 and 74 may be simultaneously adjusted by means of the potentiometer 76.

Since the relative bias voltages on the grids 72, 73 and 74 must be selected so as to compensate for the phosphor efficiencies of the respective phosphors in the screen of the picture tube 17, the circuit parameters of the phase changing network 20 must be chosen accordingly. By utilizing the phase shift transformers 89 and 97 for effecting the necessary phase shifts in the subcarrier reference wave, the LC ratios of the respective transformer windings may be chosen to effect the proper bias voltages on the grids 72, 73 and 74 so as to obtain the required compensation for phosphor efficiency. In the alternative, the D.C. potential on other control electrodes of the guns may be adjusted to compensate for variations in phosphor efficiency as will be readily apparent to those skilled in the art.

While the invention has been described in connection with particular embodiments of the invention, it will be understood that various modifications may be made thereon which are within the true spirit and scope of the invention as defined in the appended claims.

What is claimed as new and desired to be secured by Letters Patent of the United States is:

1. A color television receiver comprising means for receiving a color television signal having a video carrier wave modulated by a luminance signal and by a chroma modulated subcarrier wave, means detecting the luminance signal portion of said modulated carrier wave, means for detecting the chroma modulated subcarrier wave portion of said modulated carrier wave, first amplifier means for amplifying said detected luminance signal, second amplifier means for amplifying said detected chroma modulated subcarrier, said first and second amplifying means being mutually exclusive, means for varying the relative gains of said first and second amplifiers, means for generating a wave at the frequency of said subcarrier, phase shifting means for developing three waves each of which has a frequency of the subcarrier but which are phased with respect to one another by phase angles which are substanitially equal to the phase angles separating the three color components of the received wave, picture tube means having three substantially independent electron beams, three sets of at least two electrodes in said picture tube means for controlling the intensity of the respective beams in accordance with the difference in potential between the electrodes in the associated set of electrodes, means for superimposing the amplified detected luminance signal and the amplified chroma modulated subcarrier on corresponding ones of said sets of electrodes in parallel, and means for coupling said three waves from said phase shifting means to respective ones of the others of said electrodes.

2. A television receiver responsive to a received wave for reproducing a televised image in simulation of its natural colors, which receiver comprises means for receiving a wave including a luminance signal and a chroma modulated subcarrier both modulated on a transmitted video carrier wave, means for detecting said luminance signal, means for detecting said chroma modulated subcarrier, means for controlling the relative amplitudes of said luminance signal and said chroma modulated subcarrier, means for combining said chroma modulated subcarrier and said luminance signal, a three-gun picture tube in which each gun includes a cathode electrode and a beam current controlling electrode, means for applying the combined chroma modulated subcarrier and the luminance signal to respective ones of said electrodes in all of said guns in parallel, means for providing three waves having the subcarrier frequency and corresponding in phase to the color components of the chroma signal, said color components being the color of the phosphors on the screen of the picture tube, and means for supplying said three waves to the respective other ones of said electrodes.

3. The receiver of claim 2 wherein said last named means comprises a plurality of phasing transformers.

4. In a color television receiver of the type described a three-gun picture tube, a cathode and associated control grid in each gun, means for supplying the luminance signal wave and the chroma modulated subcarrier wave of a received color television signal to said cathodes in parallel, and means for supplying three out-of-phase subcarrier frequency reference waves to respective ones of said control grids, said last named means including a single potentiometer for simultaneously varying the bias voltage on all of said control grids.

5. In a color television receiver, a three-gun picture tube, a source of subcarrier reference oscillations, means for supplying a portion of said oscillations directly to one of said guns, first transformer means having tuned primary and secondary windings, means for supplying said reference oscillations to said transformer means to cause a shift in phase therein of plus ninety degrees, means for supplying the phase shifted oscillations from said first transformer means to another of said guns, a second transformer means, means for supplying said oscillations to said second transformer means to effect a phase shift therein of minus one hundred twenty-four degrees, means for supplying the phase shifted oscillations from said second transformer means to still another of said guns, means for receiving a high frequency color television signal, means for detecting said high frequency signal to derive luminance and chrominance components therefrom, means for selectively amplifying said components, means to additively combine said luminance and chrominance components, and means for applying the combined components in parallel to like electrodes of said guns.

6. In a color television receiver, a three-gun picture tube, a source of subcarrier reference oscillations, means for supplying a portion of said oscillations directly to one of said guns, first transformer means having tuned primary and secondary windings, means for coupling said reference oscillations to said transformer means to cause a predetermined shift in phase thereof, means for supplying the phase shifted oscillations from said first transformer means to another of said guns, a second transformer means, capacitor means for coupling said oscillations to said second transformer means to effect a phase shift therein, means for supplying the phase shifted oscillations from said second transformer means to still another of said guns, means for receiving a high frequency color television signal, means for detecting said high frequency signal to derive luminance and chrominance components therefrom, means for selectively amplifying said components, means to additively combine said luminance and chrominance components, and means for applying the combined components in parallel to like electrodes of said guns.

7. In a color television receiver, a three-gun picture tube each of said guns having a cathode and a grid, a source of subcarrier reference oscillations, means for supplying a portion of said oscillations directly to the grid of one of said guns, first transformer means having tuned primary and secondary windings, means for supplying said reference oscillations to said transformer means to cause a shift in phase therein of plus ninety degrees, means for supplying the phase shifted oscillations from said first transformer means to a grid of another of said guns, a second transformer means, capacitor means for coupling said oscillations to said second transformer means to effect a phase shift of minus one hundred twenty-four degrees therein, means for supplying the phase shifted oscillations from said second transformer means to the grid of still another of said guns, means for receiving high frequency color television signals waves, means for detecting said waves to derive luminance and chrominance components therefrom, means for selectively amplifying said luminance and chrominance components, means to additively combine said amplified luminance and chrominance components and means for applying the combined components in parallel to all of the cathodes of said guns.

References Cited in the file of this patent

UNITED STATES PATENTS

| | | |
|---|---|---|
| 2,758,155 | Kirkwood | Aug. 7, 1956 |
| 2,811,580 | Avins | Oct. 29, 1957 |
| 2,819,335 | Massman | Jan. 7, 1958 |

OTHER REFERENCES

RCA Color Television Receiver, Service Data, Model CT-100, Mar. 31, 1954, pages 31 to 34.